US012627976B2

(12) United States Patent
Jungerman et al.

(10) Patent No.: US 12,627,976 B2
(45) Date of Patent: May 12, 2026

(54) SECURE WIRELESS INDUSTRIAL MESH NETWORK

(71) Applicant: Operant Networks, Santa Rosa, CA (US)

(72) Inventors: Roger L Jungerman, Petaluma, CA (US); Randall King, Santa Rosa, CA (US)

(73) Assignee: Operant Networks, Santa Rosa, CA (US)

( * ) Notice: Subject to any disclaimer, the term of this patent is extended or adjusted under 35 U.S.C. 154(b) by 320 days.

(21) Appl. No.: 18/362,883

(22) Filed: Jul. 31, 2023

(65) Prior Publication Data

US 2024/0147224 A1     May 2, 2024

Related U.S. Application Data

(60) Provisional application No. 63/419,933, filed on Oct. 27, 2022.

(51) Int. Cl.
*H04W 12/00*     (2021.01)
*H04W 12/0431*     (2021.01)
(Continued)

(52) U.S. Cl.
CPC ..... *H04W 12/009* (2019.01); *H04W 12/0431* (2021.01); *H04W 24/02* (2013.01); *H04W 84/18* (2013.01)

(58) Field of Classification Search
CPC ..... H04W 84/18; H04W 76/15; H04W 24/02; H04W 84/12; H04W 88/16;
(Continued)

(56) References Cited

U.S. PATENT DOCUMENTS

| | | | | |
|---|---|---|---|---|
| 6,018,770 A | * | 1/2000 | Little .................. | H04L 12/6418 |
| | | | | 709/223 |
| 10,088,818 B1 | * | 10/2018 | Mathews ............... | G05B 15/02 |

(Continued)

FOREIGN PATENT DOCUMENTS

| | | | | |
|---|---|---|---|---|
| WO | WO-03015452 A2 | * | 2/2003 | ......... H04L 41/0893 |
| WO | WO-2023009796 A2 | * | 2/2023 | ............ H04W 88/16 |

OTHER PUBLICATIONS

Bhatia, Laksh, et al. "IRONWAN: Increasing reliability of overlapping networks in LoRaWAN." IEEE Internet of Things Journal 9.13 (2021): 10763-10776. (Year: 2021).*

(Continued)

*Primary Examiner* — Lizbeth Torres-Diaz
(74) *Attorney, Agent, or Firm* — Perkins Coie LLP

(57)     ABSTRACT

Disclosed herein are systems, methods, and computer-readable media related to secure wireless industrial mesh networking. An example wireless mesh network includes one or more wirelessly connected gateways communicatively coupled to a plurality of sensors and including a floating gateway and a backhaul gateway. Operations are performed in response to (1) receiving, at the backhaul gateway, a collection state query and (2) receiving, at the backhaul gateway and via at least one of a floating gateway and a sensor, sensor data. The operations can include generating, by the backhaul gateway, a collection publication instruction including sensor data; transmitting, by the backhaul gateway, the collection publication instruction to the requesting system; and synchronizing, by the backhaul gateway, the sensor data with the wirelessly connected floating gateway.

23 Claims, 8 Drawing Sheets

(51) Int. Cl.
  *H04W 24/02*        (2009.01)
  *H04W 84/18*        (2009.01)
(58) Field of Classification Search
  CPC ............ H04W 12/009; H04W 12/0431; H04L
                                      63/20; H04L 63/0281
  See application file for complete search history.

(56)                References Cited

U.S. PATENT DOCUMENTS

| | | | |
|---|---|---|---|
| 10,149,141 B1 * | 12/2018 | Stamatakis | .............. H04L 67/10 |
| 10,257,678 B2 * | 4/2019 | Hoseinitabatabaei | ........................ |
| | | | G06N 20/10 |
| 10,379,873 B2 * | 8/2019 | Leon | ..................... G01S 5/0295 |
| 10,945,105 B1 * | 3/2021 | Konen | .................. H04W 4/029 |
| 11,575,512 B2 | 2/2023 | King et al. | |
| 12,177,778 B2 * | 12/2024 | Heeger | ..................... H04L 9/12 |

| | | | |
|---|---|---|---|
| 2007/0059986 A1 * | 3/2007 | Rockwell | ............... G01R 31/52 |
| | | | 340/10.41 |
| 2009/0154481 A1 * | 6/2009 | Han | ....................... H04W 72/02 |
| | | | 370/465 |
| 2009/0285154 A1 * | 11/2009 | Gesmundo | ......... H04B 7/18584 |
| | | | 370/316 |
| 2018/0176079 A1 * | 6/2018 | Teo | ........................ H04W 76/40 |
| 2022/0255805 A1 * | 8/2022 | Hausermann | .......... G16Y 20/20 |

OTHER PUBLICATIONS

Jusis, Mindaugas. Method of data synchronization of autonomous port handling processes. Diss. Vilniaus universitetas., 2021. (Year: 2021).*

U.S. Appl. No. 63/059,876, "Comprehensive Configurable Network Security for Distributed Energy Resource Infrastructure", filed Jul. 31, 2020.

* cited by examiner

SECURE WIRELESS INDUSTRIAL MESH NETWORK

TECHNICAL FIELD

The present technology is directed generally to secure sensor networks. More specifically, the present technology is directed to secure wireless industrial mesh networks.

BACKGROUND

Wireless mesh networks are of interest in electrical smart-grid applications, predictive maintenance of rotating industrial machinery, and for wide deployment for the Industrial Internet of Things (IIoT). In IIoT, numerous sensors such as temperature, pressure, vibration or weather are distributed over a wide spatial area. The aggregated measurements, together with sophisticated analytics and artificial intelligence (AI), are used to optimize the performance, efficiency, reliability, and cost of these physical infrastructure systems.

Figure 1:
FIG. 1 shows an example data flow in a secure wireless industrial mesh network, according to some embodiments.
Figure 1:
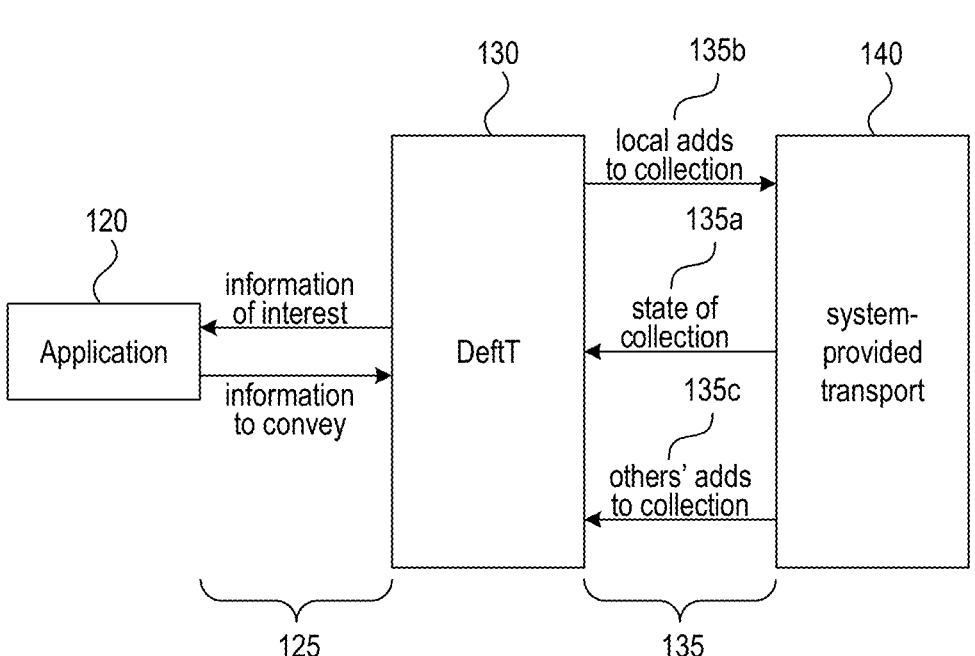

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Wireless networking can be preferred for sensors since units can be dispersed across the wireless coverage range and moved as needed. Expensive and cumbersome physical wiring to sensors is avoided. However, wireless connectivity also potentially offers an attack surface for cyber intrusions. Historically, there were relatively few large centralized industrial processing facilities, or in the case of power plants only hundreds were employed to meet the utility grid requirements. Maintenance and wiring of these plants could be managed locally behind secure fences. With increasing numbers of widely dispersed wireless sensors, these physical controls are no longer practical. For example, distributed renewable energy (DER) power systems and IIoT sensors are much smaller, and there can be hundreds of thousands of widely scattered installations; thus legacy security approaches are no longer practical. In the U.S. and elsewhere, cybersecurity threats including distributed denial of service (DDoS) attacks, malware, ransomware, data theft, and other internet-based attacks are becoming common. The scale of the cybersecurity challenges that industrial and power grid operators face is enormous, as this vital infrastructure is targeted by sophisticated adversaries including nation-state actors.

Ensuring that wireless sensor networks are resilient and secure is another technical problem. With climate change, significant disruptions to the power grid due to hurricanes and wildfires have recently become much more common. In 2019, a series of planned public power safety shutoffs in California were enacted to avoid starting wildfires due to arcing from power lines. Consequently, approximately three million customers lost power, often for several days. Such large-scale blackouts, particularly when unplanned, can be destabilizing to the grid. Managing blackout events rapidly sometimes requires a more decentralized grid architecture and sensor network, to support the grid infrastructure and recovery efforts needed in the event of a disruption. This network should be capable to adapt to deliver timely sensor data even if parts of the network are compromised or destroyed. There is thus a need for cyber-secure, resilient, wireless IIoT networks to cost-effectively address requirements for robust connectivity to dispersed advanced sensors providing operational insight into critical industrial infrastructure systems.

LoRaWAN, a communication protocol used in wireless sensor networks, is a low-power, low-bit-rate wireless protocol with excellent signal-to-noise and range. LoRa is the radio signal that carries the data communicated via LoRaWAN. LoRa has a large link budget due to its narrow-bandwidth, low-bitrate, and sophisticated signal processing. The modest power requirements of LoRaWAN are also well suited to sensor applications, since the sensors can be battery-powered and deployed quickly and flexibly.

A technical drawback of LoRaWAN is that the protocol is limited to a star-topology and supports a single wireless hop. In a conventional LoRaWAN deployment, the hub gateway needs to backhaul the sensor data through a wired or fiber internet connection or via a cellular modem. This backhaul wiring can add significant cost. For example, when retrofitting sensors into industrial nuclear power plant applications, it is estimated that drilling through thick concrete plant walls, including necessary regulatory reviews, adds ~$2000 per foot of wiring. Also, the LoRaWAN gateway hub can be a single point of failure. Though multiple gateway hubs can be deployed within range of the sensors, with an independent backhaul connection for each gateway hub, this adds still further cost.

Conventional LoRaWAN suffers from other shortcomings. For example, LoRaWAN uses an Advocates of Linux Open-source Hawaii Association (ALOHA) protocol to handle multiple sensors with burst transmissions. When a battery-powered end sensor device wakes up from a low-power-draw sleep mode, it sends a burst of sensor data. If numerous sensors are present on the same network, the data packets can collide, resulting in packet loss. The sensor data backhaul from the LoRaWAN gateways is typically via wired Transport Control Protocol (TCP) ethernet connections collecting all the data. As a further example, in LoRaWAN, there is currently no ability to implement access control, in terms of which users have rights to view selected sensor readings with granular control.

Another shortcoming of LoRaWAN is its limitations related to cybersecurity, particularly for critical digital assets (CDA), such as chemical process control systems, utility infrastructure, and nuclear power plants. While LoRaWAN supports encryption, other security requirements including strong authentication, control of private keys, access controls, and the secure distribution of certificates in the low-cost battery powered sensors are limited. Modern secure cyber key storage mechanisms, such as using a hardware Trusted Platform Module (TPM), are not supported. Without securely stored private keys, authentication compromise is possible. For instance, with LoRaWAN, if the shared Advanced Encryption Standard (AES) encryption key is compromised, it is possible for an adversary to wirelessly spoof sensor readings, such as an over-temperature condition with possible dire consequences in these critical industrial assets.

Additionally, there have been recent advances in LoRa radio technology integrated circuits, such as the Semtech SX1303 concentrator, which enables multiple LoRa channels to be simultaneously demodulated. While LoRaWAN provides some degree of support for these demodulators in gateways, the control of the demodulator characteristics such as spread factor (SF) is managed by a centralized network controller. For a resilient network, in conditions where the wireless environment, including interference and signal fading, can vary rapidly, local control of the demodulator characteristics can result in a more robust system.

To address the various shortcomings discussed above, as well as other limitations with existing solutions known to those skilled in the art, described herein is a network employing a "mesh of stars" (the "secure wireless mesh network system" or the "system"), and associated methods and computer-readable media. In some embodiments, a representative system includes access control, which provides the ability for an industrial infrastructure system administrator (e.g., an electric utility, a water utility, a gas utility, or other entity providing utility services; or an industrial process provider, including chemical, oil refining, or manufacturing; or environmental control including building managements systems, HVAC, agricultural and irrigation systems requiring sensor data) to define the security rights for specific sensors that can be accessed by multiple parties.

The system may, in some embodiments, include Sensor Configuration Trust Rules, which may enable the system administrator to grant sensor access to the multiple parties while providing that particular sensors are uniquely associated with specified controlled gateways within, as is needed for Critical Digital Asset (CDA) systems. In some embodiments, trust rules can be applied at the gateway level—for example, to determine a subset of sensors (e.g., an allowable subset) are authorized to establish electronic communication with a particular gateway.

In some embodiments, a secure wireless mesh network system is used to directly measure and control industrial infrastructure systems including energy generation and storage systems, industrial SCADA control systems, and building managements systems and thermostats.

In some embodiments, the mesh routing employs Information Centric Networking (ICN). In some embodiments, the mesh routing employs Named Data Networking (NDN). Furthermore, in some embodiments a robust brokerless publish/subscribe ("pub/sub") network with trust rule-based access control for the mesh and backhaul capabilities can employ Defined-Trust Transport (DefT) utilizing the underlying principles of Named Data Networking (NDN).

In some embodiments, the secure wireless mesh network system includes an administrative console through which an industrial infrastructure provider or other entity with administrative privileges can manage the secure wireless mesh network system. As described herein, the administrative console provides the ability for the infrastructure provider or other administrator to define the security rights, through one or more trust rules that collectively form a trust schema, of entities attempting to communicate with other entities (e.g., between users and/or gateways or sensors). The administrative console can enable the industrial infrastructure provider to grant access to the multiple entities without broadly exposing the industrial infrastructure provider's network to those multiple entities or other third parties.

As described herein, there are numerous variations of ICN that can be used in embodiments of the secure wireless mesh network system, such as Named Data Networking (NDN) and/or Defined Trust Transport (DefT). DefT security, DefT key distribution, DefT trust rules, and DefT publish/subscribe mechanisms have been described in the academic literature. However, the use of these DefT features and customizations in an industrial infrastructure system application, in a novel wireless mesh network (e.g., in a secure wireless mesh network system), as well as in other business-level applications, is not currently known. As described herein, the secure wireless mesh and the administrative console of the secure wireless mesh network system advantageous utilizes DefT, which helps to properly configure and distribute keys and trust rules.

As described herein, an advantage of DefT, as implemented according to various embodiments of the described system, is its ability to make cryptographic keys securely and resiliently available. By utilizing DefT, the secure wireless mesh network system can generate these DefT keys with application-meaningful hierarchical names (like all named data) and thus they can advantageously be managed in a straightforward manner. There is currently no convenient way for users to generate and organize the namespaces that enable DefT. The secure wireless mesh network system (including an administrative console), however, provides a unifying mechanism for the user to initially construct, review, and then extend the namespaces.

Another aspect of the secure wireless mesh network system is that keys are authorized and distributed as DefT data publications, with a trust chain starting with a root key certificate which is established by an outside secure mechanism. Each authorized key can have trust rules which govern the access allowed (which may be more restrictive than the root key access) as controlled by the administrative console, and can also specify if a subordinate authorized user is further allowed to issue keys further down in the key hierarchy.

In some embodiments of the secure wireless mesh network system, the administrative console can use DefT to enable consistent and simplified communication among entities (e.g., users and/or resources) operating in any of several types of infrastructure environments, including several types of communication architectures. For example, and as described further herein, the administrative console can secure communication over existing and developing standards for control of infrastructure assets (e.g., LoRaWAN, IEEE 2030.5, DNP3, modbus), over emerging communication technologies (e.g., general wireless mesh applications), and over the Internet.

Another aspect of the secure wireless mesh network system is that a commercial LoRaWAN star network (e.g., a conventional network) can be integrated with the secure wireless mesh network system using common gateway hardware thereby reducing cost and complexity. It will be appreciated that the secure wireless mesh network system efficiently maximizes the number of data packets that can be transported over the secure wireless mesh network system by optimizing the LoRa or other radio configuration to reduce the data packet Time On Air. It will also be appreciated that by using orthogonal LoRa spreading factors, many communication channels can be received simultaneously. It will be further appreciated that by allocating LoRa channels as per the system requirements within rooms on the industrial infrastructure site and for other more distant locations on the site the number of data packets supported by the secure wireless mesh network system can be increased.

Another aspect of the secure wireless mesh network system is the use of and customization of DeftT relays and Collection selection. This can reduce the number of LoRa mesh transmission hops used to move data from the edge of the secure wireless mesh network system to the limited number of secure wireless mesh network system access points with Ethernet connection. It is appreciated that each wireless transmission hop consumes LoRa wireless capacity and reduces the total number of unique data packets that can be supported by the secure wireless mesh network system.

Another aspect of DeftT pub/sub is the resiliency provided by publishing data packets through broadcast transmissions. Packets may be rebroadcast (propagated throughout a respective broadcast domain) by all entities until they reach the Ethernet wired network. It will be appreciated that DeftT data publications are ephemeral and may expire after the expected time to traverse the secure wireless mesh network system. It will be further appreciated that by expiring, ephemeral data packets no longer add to the local DeftT publication capacity limits in a DeftT collection as set by the Invertible Bloom Filter Lookup Table (IBLT). It is appreciated that the selection of the publication lifetimes, publication delay, and radio broadcast parameters and channel selection can be part of the customization of DeftT for the secure wireless mesh network system.

As described herein, by utilizing DeftT in an industrial infrastructure communication environment, the secure wireless mesh network system provides various security and architectural improvements over conventional wireless networks for sensors in an industrial environment. This integration can help to overcome various shortcomings in conventional communications infrastructure, particularly when attempting to manage the added numerous wireless nodes in an industrial infrastructure environment. It is appreciated that the authentication and signing processes present in DeftT security as customized and applied in the secure wireless mesh network system can enhance the security of a commercial LoRaWAN network so that it can address the more stringent security requirements of CDA.

As used herein, the term DER can refer to any distributed energy generation resource, including energy generation via solar, wind, hydro, etc. DER can additionally refer to an energy consumer (e.g., load control) and/or energy storage (e.g., battery storage). Such resources can be at the scale of a utility, commercial, or residential system. Although secure wireless mesh network system is described generally in the context of securing communications with LoRaWAN sensor, the system can also be used to manage communication with electrical utility assets. Examples of electrical utility assets include gas peaker plants, nuclear power plants, utility fossil fueled generation facilities, and geothermal generating plants. The secure wireless mesh network system can additionally be used to secure communication with infrastructure resources that do not generate electrical power, such as water purification and distribution systems; gas infrastructure, pipeline and distribution systems; and industrial control systems (e.g., food processing and chemical systems). As a still further example, resources managed by secure wireless mesh network system can include batteries, car chargers, building management systems, home thermostats, and the like. More generally, secure wireless mesh network system can be used to secure communication between networked resources (NRs), which can include DERs, electrical utility assets, and other examples of resources described herein.

Although the secure wireless mesh network system is described generally in the context of securing communications with LoRaWAN sensors other sensor protocols are possible for connection to the star gateway including Zigbee and physically wired serial or Ethernet connections.

Although the secure wireless mesh network system is described generally in the context of wired backhaul from selected backhaul gateways with wired Ethernet, other TCP/IP transmission media are possible such as cellular, fiber Ethernet, satellite internet, microwave, and other general purpose wireless modems.

While the secure wireless mesh network system is described primarily in the context of using DeftT, it will be appreciated that the system can utilize other communication architectures. More generally, secure wireless mesh network system can utilize any suitable form of Information Centric Networking (ICN), such as Named Data Networking (NDN), Content Centric Networking (CCN), Mobility First, extensible Internet Architecture (XIA), and others.

In some embodiments of the secure wireless mesh network system, the trust console can utilize the Versatile Security (VerSec) trust language. Versec provides a simple, general framework for constructing self-consistent, validatable names. The schema description language describes constraints on both the layout and components of names and on the structural and signing relationships between names. It is a referentially transparent, declarative language like Prolog or Datalog, based on Unification and Resolution. Its statements simply state facts that can be given in any order. Only when it has all the facts does the compiler analyze them to determine if they are consistent, complete and verifiable.

Various example embodiments will now be described. The following description provides specific details for a thorough understanding and an enabling description of these implementations. One skilled in the art will understand, however, that the system can be practiced without many of these details and/or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

LoRaWAN, ICN key distribution, DeftT trust rules, and DeftT pub/sub have been described in the academic and commercial literature. However, the overall diversity of ICN research is much broader, and the selection of these specific ICN and DeftT features for business-level application in infrastructure sensor networks is not currently known. As described herein, a secure wireless mesh network system, which may be used in an infrastructure application, properly configures and distributes keys and trust rules, defines the interfaces between commercial LoRaWAN sensors and a Collection of gateways which can both interface with these sensors, each other, and with a wired or cellular IP-based backhaul infrastructure. Properly configuring this system and interfaces, including channel selection, timing, and collections in a pub/sub architecture is challenging to optimize in order to ensure adequate resiliency, throughput, and security. It is advantageous to define DeftT shims (computer software applications that connect the application to the DeftT transport) and relays which can accurately and efficiently transition LoRaWAN published sensor data into a DeftT framework for a pub/sub broadcast wireless network. Furthermore, this should be properly integrated into a wired or cellular TCP/IP network. For efficiency, transitions across multiple permutations of these network domains should be supported, as well as providing means of enabling bidirectional communication to configure and optimize gateways and sensors. As described herein, the secure wireless mesh network system addresses these and other shortcomings, thereby providing various advantages.

In conventional sensor systems for industrial, energy, and environmental control applications, the existing communications infrastructure has various limitations that can be mitigated with the disclosed solution. First, existing sensor systems are often wired directly for communications reliability and security reasons, particularly for CDA. This greatly increases the installation costs. Secondly, wireless sensor networks, where used, typically employ a star configuration. The backhaul from the conventional star-hub must still be wired or have a cellular IP connection, with both adding cost and complexity. Thirdly, for a typical wireless sensor system (like LoRaWAN) gateway connections to the sensor backhaul IP network are allowed for all IP addresses, in an open fashion. That is, in a conventional system, there may be no way to restrict wireless sensor access to chosen gateways in secure locations. Finally, using the same gateway wireless hardware to also form a backhaul mesh network between gateways, with only a convenient select few having IP backhaul connections, is not currently supported. Creating this backhaul gateway-gateway mesh network is quite complex when considering signal interference, fading, throughput, and security requirements. As described herein, DeftT (as utilized in embodiments of the secure wireless mesh networking system) provides a secure light-weight system transport protocol that can be supported on low-cost gateway hardware, while addressing all the existing communication infrastructure limitations described above.

The potential risks associated with sensor system communications, the shortcomings of existing solutions, and the advantages provided by embodiments of the disclosed system are described more fully herein.

Operation of an Embodiment of a Secure Wireless Mesh Networking System Using DeftT Information Centric Networking (ICN) is a modern networking architecture in which identified data or content is used for access, rather than an address as is used in legacy TCP/IP. Named Data Networking (NDN) is an example of ICN. ICN has not been widely deployed commercially and is largely unknown in applications with infrastructure assets. NDN is an open-source architecture and offers a broader user community.

Some uses of ICN for access control in infrastructure systems using pub/sub has been described in U.S. Patent Application Nos. 63/059,876 ("Comprehensive Configurable Network Security for Distributed Energy Resource Infrastructure") and Ser. No. 17/390,726 ("CONFIGURABLE NETWORK SECURITY FOR NETWORKED ENERGY RESOURCES, AND ASSOCIATED SYSTEMS AND METHODS"), both of which are incorporated by reference in their entireties. The present disclosure focuses on systems, methods, and computer-readable media operable to construct a robust and efficient LoRa wireless mesh integrated with LoRaWAN devices.

FIG. 1 shows an example data flow 100 in a secure wireless industrial mesh network, according to some embodiments, using the DeftT protocol. DeftT 130 is a lightweight transport protocol (implemented by, for example, networking hardware and/or software) optimized for Operational Technology (OT) industrial networks and using the underlying principles of NDN. DeftT 130 uses named data such as NDN and a pub/sub architecture, where named collections of publications are created. As shown, applications 120 can use DeftT 130 submit and receive queries 125 to add to and/or access from a distributed collection of publications. DeftT 130 operates to add (135*b*, 135*c*) to collections (e.g., via the cAdd operation, which includes collection publication instructions broadcast in an electronic message). The DeftT 130 component can also receive and provide responses to collection state queries 135*a*.

In an example implementation, a cState (collection state) query 135*a* is broadcast, as an electronic message, by a device to all recipients indicating which publications that device has in their collection. This cState publication inventory is encoded as a binary IBLT. All other recipients with publications in their collection that are not in the IBLT then transmit any missing publications that they may have. For efficiency, all broadcast recipients add any publications from any cAdd to their local collection (135*b*, 135*c*), independent of whether they originated the cState request. This publication subscription synchronization process ensures that publications are distributed as widely and efficiently as possible to all users holding the collection.

In an embodiment, and transparently to applications 120, a DeftT 130 instance both constructs and validates all publications using a formal, validated process. New DeftT 130 instances are configured with certificates, along with a signing chain that includes its private signing identity and has the same root of trust as the certificate of trust rules. For security, DeftT 130 validates credentials as a chain of trust and against the shared trust rules and does not accept publications without a fully validated signer identity.

In an embodiment, DeftT 130 transport is optimized for broadcast networks including IPv6 UDP multicast as well as broadcast wireless radio media.

In addition to choosing DeftT as a networking protocol for the secure wireless mesh network in an example embodiment, disclosed herein are numerous customizations according to various implementations. For example, a first aspect of customization is the use of faces. A DeftT face is the interface to a particular physical or logical transport media. Examples of faces include: IPv6 UDP multicast over ethernet, a TCP wired or cellular unicast face, a broadcast wireless radio face such as a customized LoRa mesh or a commercial LoRaWAN interface. The choice of faces can be application-specific. A second customization of DeftT is through shims. Shims are application-specific code which converts between application-meaningful messages and the DeftT Publications. It is in these customized shims that aspects of the application logic resides for use cases such as a secure industrial wireless mesh network may reside. One important aspect of a shim is a relay. A DeftT relay "passes through" valid Publications from one DeftT synchronization domain to another. Finally, the specific architecture of the collections of publications, and the publications themselves, including the naming, structure, and publication lifetimes provide an efficient and complete solution suitable for a particular application 120.

Figure 2:
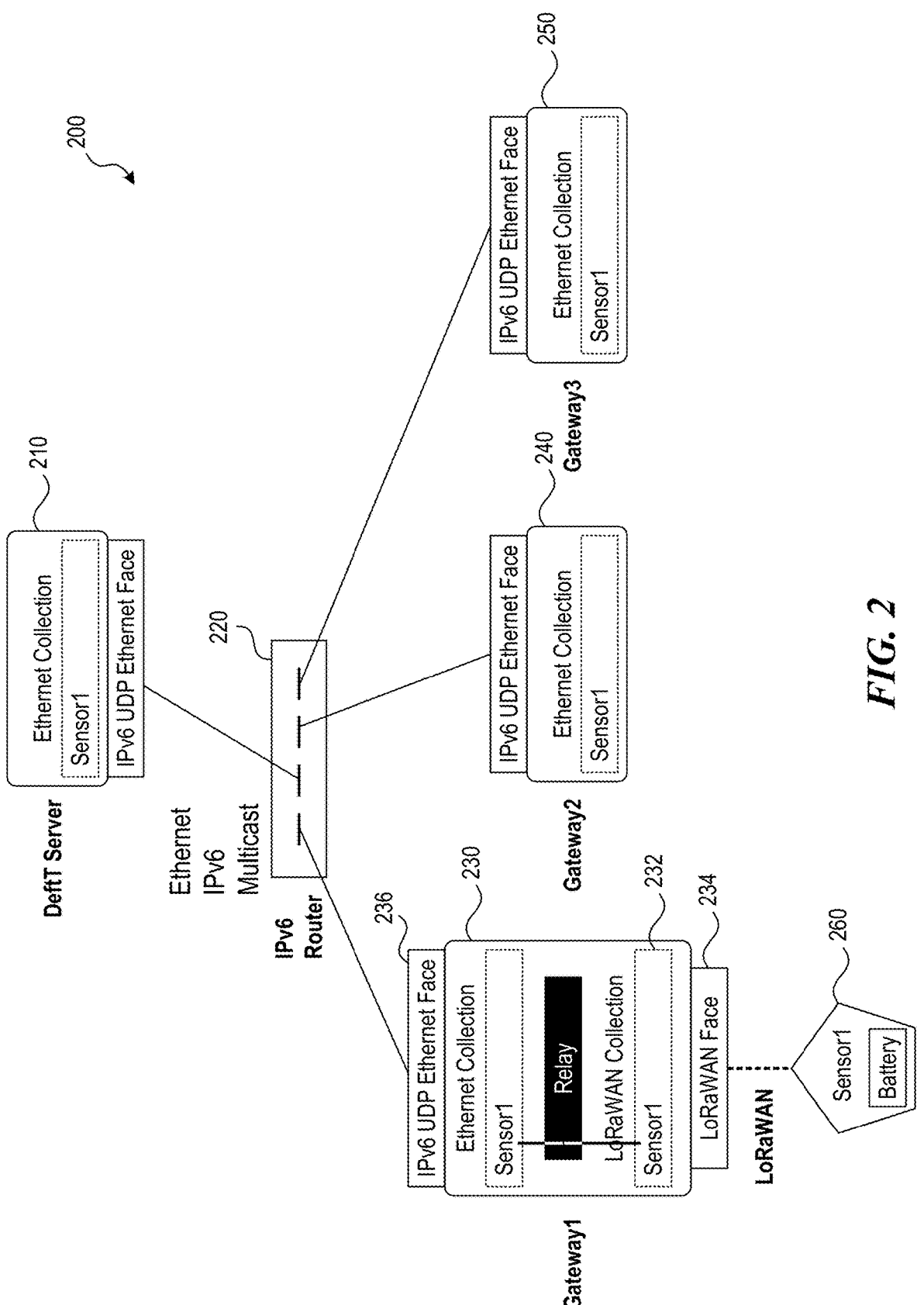
FIG. 2 shows an example configuration that includes multiple gateways in a secure wireless industrial mesh network, according to some embodiments.

An example, shown in FIG. 2, will help to illustrate the customization concepts described above. FIG. 2 shows an example configuration 200 that includes multiple gateways (230, 240, 250) in a secure wireless industrial mesh network, according to some embodiments. In an embodiment, a battery powered LoRaWAN Sensor1 260 broadcasts a LoRaWAN packet that, in this example, is only received by Gateway1 230. LoRaWAN packets have a defined structure that is not a properly structured DeftT publication but contains sufficient information to create a DeftT publication. The gateway (here, Gateway1 230) is customized with hardware, a DeftT software face 234, and/or a shim 232 to receive the LoRaWAN packet. Metadata information in the LoRaWAN packet can be included in the payload of the DeftT LoRa mesh publication and some of the information, like the sensor ID of the Sensor1 260, can be used in the DeftT publication name. The LoRaWAN DeftT collection is structured for a particular application, for example based on the type of sensors, the number of sensors, the publication lifetime for each publication, and/or other factors. The system of the example embodiment respects constraints imposed by the DeftT protocol, including the maximum number of publications per collection owing to the size of the IBLT.

Next, this LoRaWAN publication can be relayed to a second DeftT Ethernet sensor collection (not shown). The shim 232 can then use a UDP ethernet multicast Face 236 to distribute the converted received wireless data packet to all gateways (230, 240, 250) and the server 210 using a cAdd, over the comparatively broadband Ethernet connection, through an IPv6 Multicast router 220. In this way, all gateways (230, 240, 250) as well as the system servers will each rapidly obtain a fully synchronized collection of all received publications in the DeftT Ethernet collection, as shown.

Trust Schemas

Embodiments of the systems, methods and computer-readable media of the present disclosure support access control through trust schemas. A trust schema specifies which roles, behaviors, or actions are allowed and consists of several specific trust rules. The rules constrain how information such as sensor data is communicated. In DeftT trust rules are specified in the VerSec language and compiled into a compact binary form for distribution. For example, specific sensors can be constrained by a trust schema rule to only be allowed to be accessible from specific gateways. This would provide, for a particular Critical Digital Asset (CDA), that additional sensors could not be added, nor could a sensor be stolen and manipulated for spoofing, and then connected to the network in a different insecure location on a different gateway, without violating the secure trust schema. Changing the designated permissions would necessitate modifying the trust schema, which would require an authority with a high-level certificate and private key.

In some embodiments of the disclosed technology, the trust schema as well as all DeftT publications are encrypted and authenticated using strong EdDSA asymmetric signatures (other encryption/signing algorithms are also supported). Private keys are securely stored in a hardware TPM in the gateway, while servers can be secured with either a TPM, a secure cloud key vault, or an even more secure Hardware Security Module (HSM) for the certain keys, and thus may be controlled through proper business processes. Public key certificates are efficiently and securely distributed using the DeftT pub/sub transport. Application-specific hierarchical naming of role certificates, publications, and collections of publications provides business appropriate meaning. Validation of publications including user data, certificates, and trust schemas may be performed through a chain of public key certificates to a root of trust anchor that is stored locally in each gateway and server. The infrastructure system administrator (or a delegated authority with corresponding hierarchical certificate) holds the private key of the root of trust and uses it to sign all certificates and trust rules. The infrastructure system administrator controls access rights through trust rules authorized by the administrative console and authentication through the issuance of signed certificates. Self-signing or signing by a separate certificate authority can be used to authenticate the root of trust certificate.

DeftT's unit of information transfer is a publication. In some embodiments, publications can be signed and the signature can be validated upon receipt. Publications are used both for ephemeral communication, like commands and status reports which have a specified lifetime as part of the application, and longer-lived information like certificates. The set reconciliation sync protocol identifies publications using a hash of the publication, including its signature. A sync collection can contain at most one instance of any publication, so replays of publications in the collection are discarded as duplicates on arrival.

In some embodiments of the disclosed technology, all DeftT cAdd additions are authenticated. They can be either signed or AEAD encrypted with a securely distributed nonce group key. This choice can be specified in the trust schema.

In some embodiments, cAdd publication additions can be encrypted. In such scenarios, the symmetric group key is automatically and securely distributed using signing identities. Each receiver uses its copy of the current symmetric key to validate the AEAD MAC and decrypt the added content. AEAD has the advantage that it also provides authentication in a compact efficient algorithm that is well adapted to computationally lightweight gateway hardware. Some other encryption approaches are provided using potentially more secure asymmetric encryption of particularly critical publications, though this comes with computational and bandwidth overhead.

In some embodiments, the DeftT's synchronization protocol periodically republishes cState messages which results in (re) sending cAdds, if needed. Unlike unicast transports, even in an intermittent connection wireless environment, DeftT can obtain publications missing from its collection from any peer that has a valid copy, which can be advantageous in a wireless application with sporadic connectivity.

Determining the optimum cState repetition period and cAdd delay for each gateway can be part of the system design and optimization.

In some embodiments, peer entity authentication in DeftT comes through the integrated trust management engine. Every DeftT instance may be started with an identity bundle that includes the public root of trust, a certificate of the trust schema signed by the trust root, and its own signing identity chain with a private signing key and the chain signed at top by trust root. This is published before any publications are sent. The trust management engine may unconditionally drop any publication that does not have a valid signer or whose signer lacks the role or capabilities needed for that specific publication.

In some embodiments, a compromised member of a trust domain can only build messages that match the role and capabilities in its signing chain. Thus, for example, a compromised auditor can query the state of allowed systems but cannot issue modified trust rules.

Wireless LoRa

Wireless interfaces to IIoT devices and sensors offer a low-cost flexible connection. LoRa enables this application. It uses spectrum spreading to increase sensitivity and range, while overcoming interference and propagation losses which are common in industrial settings. By use of battery-based power supply, connection costs are drastically reduced. LoRa sensors can be designed to use little power. Battery lifetimes of several years are possible, given sensor updates on the order of fifteen minutes. This can be done, for example, by having devices enter a very low power sleep mode and then wake up briefly to send a packet of sensor data, periodically. Since wireless transmission is by nature a very high-power operation, the time spent transmitting should preferably be minimized and the transmitted signal power also limited. This has implications on sensor device characteristics, when contrasted with the constantly powered gateways that they communicate with. Sensors typically have a maximum LoRa transmit power of 100 mW. This limits the range of the sensors compared to gateways, which can have transmitted power up to 1 Watt in the U.S. Sensors mostly send data, and typically only listen for transmissions under special circumstances, such as for configuration.

The most common LoRa radio protocol for sensors is LoRaWAN. Existing LoRaWAN implementations use a star-based topology where the gateway hub is constantly listening for sensor transmissions. LoRaWAN has been commercially successful and there are numerous available sensors. In general, LoRa sensors cannot communicate with each other, fundamentally because they are mostly asleep, and it is too difficult to synchronize the transmissions. This, typically, precludes the use of a sensor mesh topology. A major limitation of LoRaWAN is the requirement for an IP internet connection to each gateway, which adds wiring or cellular costs, particularly in many industrial infrastructure environments. As described herein, the secure wireless mesh network system addresses these and other shortcomings.

LoRaWAN sensors have locally stored group AES-128 symmetric application and network keys as well as a Globally Unique Identifiers (GUID). If desired, a compact chip hardware device can optionally be used on the sensor to securely store the keys. These use much less power than a TPM, so are better adapted to battery powered applications. Sensors use these keys to securely send LoRaWAN packets to any in-range gateway that has an IP connection and on to the LoRaWAN network server holding the matching group AES-128 key.

Gateways, by contrast, are continuously powered and listening for transmissions. The increased supply power also enables frequent transmissions for the LoRa mesh. In addition, modern gateways can make use of a demodulator accessory chip such as the SX1303. The demodulator requires additional supply power, which is not a significant issue in the gateways. The demodulator makes it possible to simultaneously listen to up to nine LoRaWAN channels, while demodulating up to 16 separate packets. This recent advance in hardware demodulation capabilities may be advantageous for the secure wireless mesh network system disclosed herein, with enhancements to a utilized wireless networking protocol, in which the gateway can both listen for LoRa sensor data as well as form a LoRa mesh between gateways, using the same gateway LoRa radio hardware, and can thereby increase the capacity of the number of sensors. Thus, many of the extensive variety of LoRaWAN sensors can still be used, while the improved gateway software and hardware provides a gateway mesh that simplifies the interconnection, improves reliability, and reduces costs.

LoRa Star/Mesh Hybrid in a Secure Wireless Industrial Mesh Network

Figure 3:
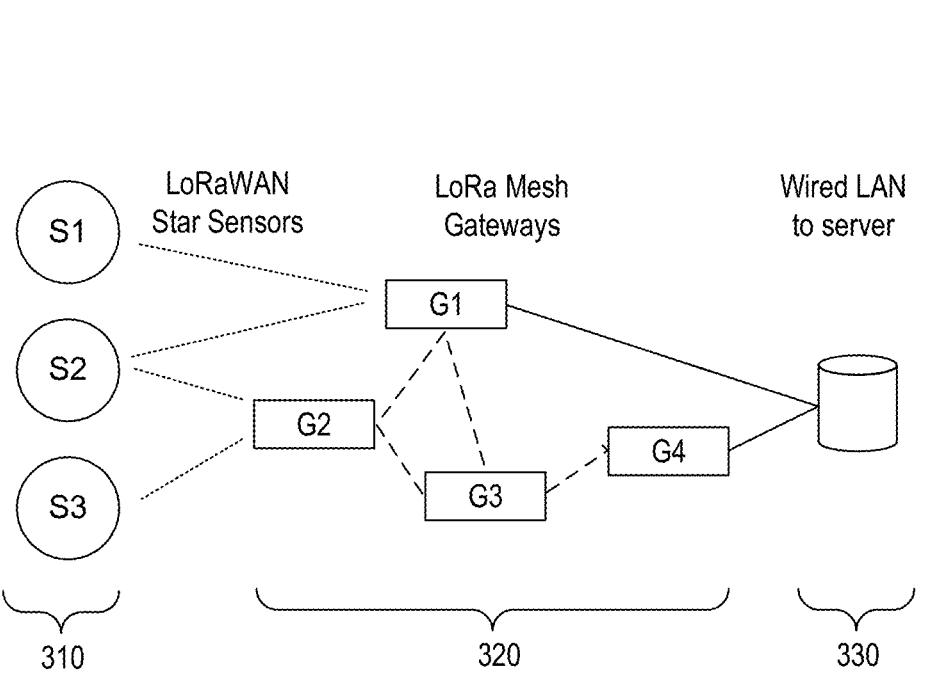
FIG. 3 shows an example LoRa/star mesh hybrid infrastructure where a secure wireless industrial mesh network can be implemented, according to some embodiments.

The secure wireless mesh networking system may, in some embodiments, utilize a "mesh of stars" architecture, as shown in FIG. 3. That is, FIG. 3 illustrates an example LoRa/star mesh hybrid infrastructure 300 where a secure wireless industrial mesh network can be implemented, according to some embodiments. As shown, the infrastructure 300 can include a plurality of sensors 310, a plurality of gateways 320, and one or more network links to server 330. In an example configuration, sensors 310 can transmit to any gateway 320 that is in range and is using the same LoRa temporal frequency plan (e.g., a given sensor 310 can communicate with one or more of the gateways 320). However, sensors 310 may not communicate with each other. As described herein, the system enhances conventional LoRa architectures in that the system (in contrast to conventional architectures) enables gateways 320 to communicate with each other through a resilient LoRa mesh, as well as to the broadband wired (or cellular) internet and server through those gateways 320 that also have an IP internet connection.

In the example of FIG. 3, backhaul gateways (e.g., G1 and G4) in a conventional system typically do not exchange data (e.g., over a LoRa mesh connection), since backhaul is supplied by the higher bandwidth wired Ethernet, without using LoRa mesh radio bandwidth. However, in the secure wireless mesh network system it is possible to have LoRa mesh connection as well, if desired. Since the LoRa radio is now shared between the sensor LoRaWAN (e.g., coupling the sensors to the gateway) and the novel LoRa mesh (e.g., coupling the gateways to each other), this puts some additional constraints on the use of the radio hardware and software.

In some embodiments, the LoRa mesh can also be used without LoRaWAN for the star network. Sensors 310 or site equipment such as industrial infrastructure equipment (e.g., DER) can be connected with other means to the secure wireless mesh gateways using a variety of physical media such as wired Ethernet or serial connections. One of skill will appreciate that sensor and infrastructure protocols need not be restricted to LoRaWAN and can include SCADA protocols such as DNP3, modbus, or generalized serial and Ethernet protocols. In this way dispersed sites, many without Ethernet backhaul can share and access it securely, resiliently, and with access controls using the secure wireless mesh network system.

LoRa Radio Limitations and Mitigation Strategies in Embodiments of a Secure Wireless Industrial Mesh Network Limitations of Today's LoRaWAN and LoRa

TABLE 1

| | | | | | Maximum Packet (Byte) | Time on Air (ms) | Transmit Power (dBm) | Sensitivity (dBm) | Link Budget (dB) |
|---|---|---|---|---|---|---|---|---|---|
| | BW (kHz) | Frequency Hop | SF | Bit Rate | | | | | |
| Sensor | 125 | Yes | 8 | 3125 | 125 | 400 | 20 | −126 | 146 |
| Sensor | 125 | Yes | 10 | 980 | 11 | 370.7 | 20 | −132 | 152 |
| cAdd | 125 | Yes | 7 | 5470 | 242 | 399.6 | 30 | −123 | 153 |
| cAdd | 125 | Yes | 9 | 1760 | 53 | 390.1 | 30 | −129 | 159 |
| cState | 500 | No | 8 | 12500 | 222 | 164 | 30 | −121 | 151 |
| cState | 500 | No | 9 | 7000 | 222 | 292 | 30 | −124 | 154 |
| cState | 500 | No | 10 | 3906 | 222 | 533 | 30 | −126 | 156 |

Example LoRa Channel Parameters for the Hybrid Mesh-Star

The LoRa radio protocol was designed to provide advantageous sensitivity (and therefore range). The Shannon-Hartley theorem therefore fundamentally limits the effective bit rate of LoRa radios, compared to other lower range wireless protocols. This slower transmission speed makes it difficult to support multiple sensors in a dense area. This limitation is revealed in long Time On Air (TOA) for each LoRa packet, meaning that only a few radios can share a spectrum and wireless coverage area without packet collision and packet loss.

LoRaWAN sensor radios operate with an ALOHA protocol in which they transmit at their programmed frequency as soon as they wake up. There is therefore a risk that two sensors in the same general area will attempt to transmit at the same time, since the transmissions are asynchronous. Two packets which overlap will often result in the loss of one or both sensor readings, depending on their relative signal powers at each receiving gateway.

Additionally, a gateway which has both transmit and receive capability cannot perform both functions simultaneously as the transmitter power will saturate the receiver input and render it inoperable for the duration of the transmission. ALOHA LoRaWAN sensor transmissions colliding with the mesh gateway transmission therefore makes packet drops even more likely.

In the U.S., the Federal Communications Commission (FCC) has regulatory requirements on the usage patterns of 900 MHz radio spectrum used by LoRa. One goal for this regulation is to reduce the time averaged spectral power density during transmissions. Transmitted signal power of up to 1 Watt is allowed provided that (for bandwidths of 125 kHz or less) the LoRa packet duration is restricted to no more than 400 ms and repeated no more frequently than once each 20 seconds for each of 64 channels. This can necessitate hopping of frequency channels. Channels with bandwidths greater than 125 kHz have no restriction on timing, even for powers up to 1 Watt. Various combinations of bandwidth and spread factor (SF) that meet these requirements are shown in Table 1 and provide guidance as to the RF design space for the secure wireless mesh networking system.

Table 1 therefore summarizes some of the tradeoffs for the disclosed hybrid mesh-star. The sensitivity of −126 dBm is shown for reference in the shaded case of 500 kHz with SF 10. Previous field experiments validated that this radio configuration has adequate sensitivity for the challenging industrial environment in a nuclear power plant with thick shielding walls.

Mitigation Strategies in Secure Wireless Industrial Mesh Network

To overcome the limited LoRa bit rate, one or more of the strategies described below can be utilized, according to various techniques or combinations thereof, in embodiments of the disclosed system.

According to one technique, multiple uplink channels can be used. Multiple radio channels allow the simultaneous transmission and reception of many more LoRa packets. In the U.S. the allowed LoRa channel allocation in the 900 MHz band includes 72 uplink channels. Within these there are eight sets of eight 125 kHz uplink channels and eight 500 KHz channels. The SX1303 demodulator IC discussed previously supports specifying eight 125 kHz channels for variable SF demodulation. All SFs are orthogonal so that the SX1303 can demodulate several packets on the same channel from different sensors, provided they are transmitted with different spread factors for a total of 16 total demodulated packets. In addition, the SX1303 supports an additional single fixed SF channel with optionally 500 KHz bandwidth. This is dramatically more LoRa channel detection capability than legacy LoRa radios that only supported a single receive channel.

According to another technique, optimizing the SF of each channel to increase its bit rate and reduce the TOA of each packet can also increase the throughput of a channel. Each channel can have SF between 7 and 10. A larger spread factor increases the signal averaging of the spectral spreading, reduces the bandwidth, and increases the TOA, though it may be preferrable to increase the sensitivity and range in some cases.

According to yet another technique, to reduce transmission collisions and dropped packets, gateways may have an additional function termed Listen Before Talk (LBT). Since the TOA of the packets are relatively long, LBT prevents starting a new transmission on a channel that is already in use. For commercial LoRaWAN sensors with ALOHA and no LBT this collision cannot be avoided. If a mesh gateway is already transmitting and a sensor starts up with ALOHA, the gateway cannot receive that sensor reading on any channel. Hence, to reduce lost or delayed sensor data, it may be desired in some embodiments of the system to employ additional mesh gateways so that each LoRaWAN sensor will be received by at least two independent mesh gateways. Both gateways are unlikely probabilistically to be transmitting at the same time as each LoRa mesh gateway's LBT function will significantly reduce this probability. Additionally, the LoRaWAN sensor channels are at different SFs than the mesh and will not interfere with the gateway that is transmitting (even if on the same frequency), so the gateway that is not transmitting can still receive the LoRaWAN packet. In general, having multiple gateways receiving each LoRaWAN packet is desirable, in any case, to guard against system outages due to interference of equipment moving in front of radios, and gateway hardware or power failures.

Example LoRa Channel Allocations

Figure 4:
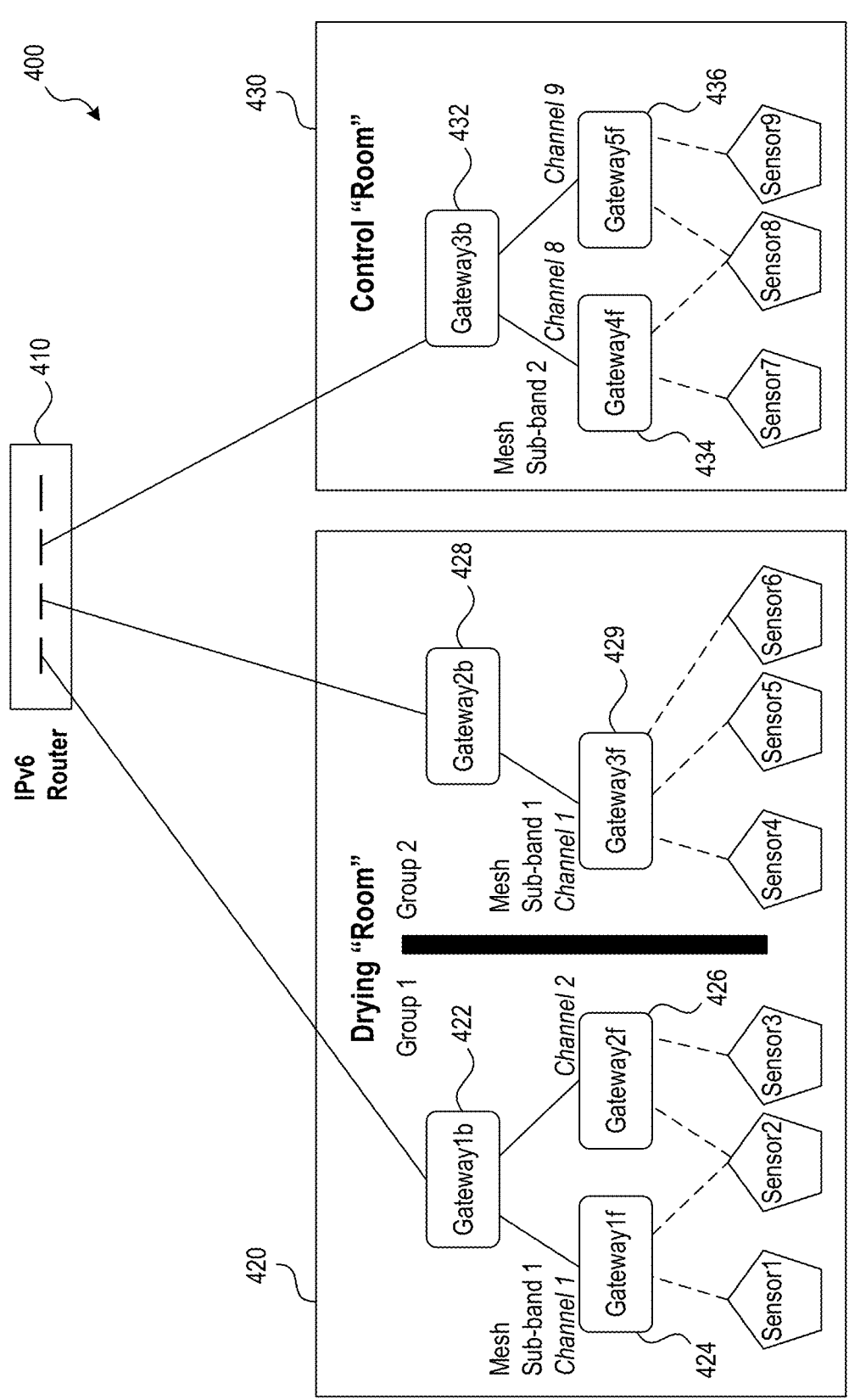
FIG. 4 shows example groupings of gateways optimized for collision avoidance in a secure wireless industrial mesh network, according to some embodiments.

FIG. 4 shows example "rooms"/groupings (420, 430) of gateways (422, 424, 426, 428, 429, 432, 434, 436) optimized for collision avoidance in a secure wireless industrial mesh network, according to some embodiments of the disclosed technology. As shown, the backhaul gateways (422, 428, 432) each correspond to respective broadcast domains for the devices associated with each respective one of the backhaul gateways (422, 428, 432).

In some embodiments, to reduce channel collisions in an IIoT application, the 72 LoRa channels can be assigned so that adjacent (neighboring) "rooms" in an industrial infrastructure setting are assigned different frequencies so there is no direct interference. These "rooms" are for example at different portions of an industrial plant such as a Drying room 420 and a Control room 430 in an industrial infrastructure plant. An example channel frequency and SF assignment is shown in Table 2. Eight independent "rooms" can be supported. Accordingly, eight independent sensor channels can be supported in a unique sub-band of frequencies per room are retained to reduce the likelihood of ALOHA collisions. Even for LoRa transmissions, there is generally significant signal attenuation and scattering in an IIoT setting. Hence, through careful assignment of the sub-bands to physical rooms more than eight rooms can be accommodated, since there will be less signal interference between distant "rooms" on the same sub-band.

radio as part of the cState packet reception. Wireless signals are generally reciprocal, meaning that the if radio A transmits to radio B the signal and noise will be nearly the same as if radio B transmitted to radio A. As a result, a gateway can use the received signal strengths to optimize its own SF selection, e.g. a lower cAdd SF can be used when a strong signal is detected from the cState, reducing the cAdd TOA so that additional sensors and cAdds can be accommodated. SF selection is thus made locally, needing no centralized control.

A gateway will likely receive many cState transmissions for different collections from various gateways. All of this information can be used to determine the optimum SF, for example taking an average. Other machine learning (ML) approaches can be used to optimize the number of sensors by adjusting the SF, including using the data from the strategy collection. In contrast, the LoRaWAN sensor SF values will typically be set at installation time, though they can also be reconfigured (either manually or through an automated system) using a LoRaWAN downlink capability, enabling it to be adjusted in use if the need arises.

Based on the site details, modifications to these allocations can be made. This can include, for example, allocating additional channels from the sensors to either or both the cState and cAdd transmissions or assigning differing orthogonal SF to mesh and sensors.

Network Architecture for Optimization of DeftT Collections and Publications

Figure 5:
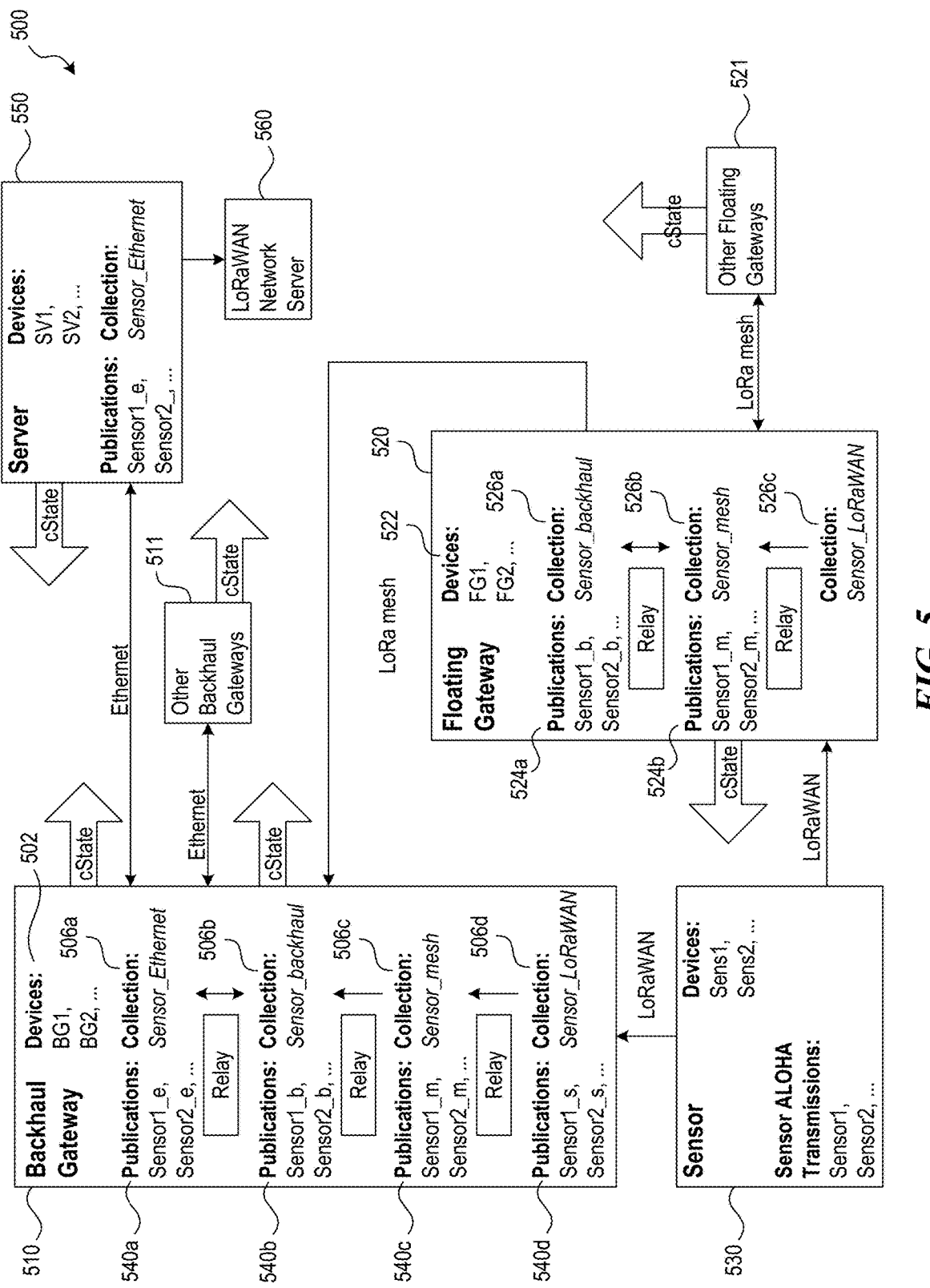
FIG. 5 shows an example network architecture to optimize traffic in a secure wireless industrial mesh network, according to some embodiments.

FIG. 5 shows an example network architecture 500 to optimize traffic in a secure wireless industrial mesh network, according to some embodiments of the disclosed technology. The optimization can be accomplished, in some embodiments, by implementing one or more backhaul gateways 510 and floating gateways 520, each having a plurality of collections (506a-d, 526a-c) in a way that minimizes the

TABLE 2

Example Channel and Spread Factor Assignments

| Room | Subband | Sensor/ cAdd Channels | Bandwidth | Sensor SF | cAdd SF | Mesh cState channel | Bandwidth | Mesh cState SF |
|------|---------|------------------------|-----------|-----------|---------|----------------------|-----------|----------------|
| 1 | 1 | 0-7 | 125 kHz | 8 or 10 | 7 or 9 | 64 | 500 kHz | 10 |
| 2 | 2 | 8-15 | 125 kHz | 8 or 10 | 7 or 9 | 65 | 500 kHz | 10 |
| . . . | . . . | | | | | | | |
| 8 | 8 | 56-63 | 125 kHz | 8 or 10 | 7 or 9 | 71 | 500 kHz | 10 |

With LoRa modulation, a pair of interfering signals overlapping can result in the dropping the weaker of the pair if there is 6 dB or more difference in the received signal strength at the gateway. In this way different groupings of gateways can use the same channels and SF provided there is significant power level differences between them. These "rooms" (420, 430) and groupings are illustrated in FIG. 4. As shown, two gateways (424, 429) in the Drying "room" 420 can share the Sub-band 1 Channel 1, since they are separated by a thick attenuating wall. A separate set of sensors in the Control "room" on Sub-band 2 are at different frequencies and do not interfere with any of the sensors or gateways in the Drying "room", even though the separating wall may be thin.

In some embodiments, SFs can be assigned dynamically during network operation to optimize performance. The SF selection for the sensor reading transmission cAdd (e.g., SF7 or SF9) can be determined from the received cState sensor reading request signal strength, as measured by the cAdd size of data packets for synchronization of publications (504a-d, 524a-c) and helps avoid network traffic collisions. The backhaul gateways 510 and floating gateways 520 can be connected to one or more sensors 530. The backhaul gateways 510 can further be connected to one or more servers 550.

Traditionally in a pub/sub network, all the LoRa mesh gateways that share the Sensor_mesh mesh sensor collection would attempt to synchronize using cState and cAdd Publications until each had a copy of all of the Sensor_mesh publications. This uniform distribution of sensor data is often unnecessary in these IIoT applications, where the primary goal is to get all sensor readings into the Ethernet domain (termed "data extraction" here). Distributing sensor data widely is therefore only of utility when it increases the reliability of data extraction. Otherwise, distributing data widely in the wireless domain limits system throughput.

Accordingly, in embodiments of the disclosed technology, optimizing the definition and usage of collections of publications and how they are linked with DeftT transport relays improves the sensor data flow so that unneeded transmissions are avoided, increasing the number of supported sensors. There are two types of publications in a typical IIoT system: 1) sensor readings and 2) strategy diagnostics that are used to monitor and administer the system. Other publication types such as control commands can also be supported in a similar way in the DeftT wireless mesh network, but are not described here, for simplicity.

For each of these publication types there exist different physical transports: LoRaWAN wireless, LoRa mesh wireless, and wired Ethernet which each have their own collections of publications. The use of different publication collections allows the efficient customization of the transport to efficiently deliver data as shown in FIG. 5.

Flow of the LoRaWAN sensor 530 readings and the DeftT publication flow via cAdds are shown as arrows. The DeftT cState pub/sub synchronization requests are also shown for the entitles, collections and physical media faces that initiate them. Custom relay shims control the transfer of publications between these collections, including the option of providing access controls to set permissions. For example, LoRaWAN sensor 530 data is asynchronously broadcast periodically by the sensors without requiring a DeftT cState pub/sub synchronization request since the LoRaWAN sensors 530 typically are not using DeftT. The sensor reading is received by gateways (510, 520) that are within range, and via a custom shim is put into a DeftT collection Sensor_LoRaWAN in each gateway (510, 520). The sensor data is then wrapped with a header to put it into DeftT LoRa mesh format in a custom relay shim for the collection Sensor_mesh.

As shown, there is a second LoRa mesh collection Sensor_backhaul which, in some embodiments, fully resides on the backhaul gateway 510 (with Ethernet connection), and which also includes sensor data transferred over Ethernet into Sensor_Ethernet. By separating the backhaul gateway 510 and floating gateway 520 (no Ethernet connection) sensor collections, it is possible to minimize the mesh traffic throughout the network by not sending cState mesh requests for readings or cAdd data responses for sensor readings that have already been captured in the Ethernet domain. This may be accomplished by only sending sensor cState messages from the Sensor_backhaul collections on the backhaul gateways 510 and by not allowing cAdds from the backhaul gateways 510. In addition, by separating the cState requests from the backhaul gateways 510 and floating gateways 520 into different collections, receiving gateways can determine the source of the requests. Since the goal is to efficiently transfer the sensor data to the Ethernet domain, in some embodiments, preference can be given to cState requests from the backhaul Sensor_backhaul collection, and cAdds can optionally be optimized for SF based on the signal strength of the Sensor_backhaul cStates by weighting the backhaul gateways values more strongly.

Technical Advantages of Optimizing DeftT Collections and Publications

To reach the overall goal of efficient data extraction with reduced wasted transmissions, the technical characteristics described below can be advantageous in a network design employed in embodiments of the disclosed system, discussed below in reference to the example embodiment of FIG. 5.

Certain technical characteristics relate to optimizing the operations of LoRaWAN sensors 530. Data can be transmitted asynchronously by LoRaWAN sensors 530 without requiring a cState request. Collections from LoRaWAN sensors 530 can be received in a custom DeftT shim and converted into Sensor_LoRaWAN collection publications in all gateways (510, 520, 521). Such embodiments accomplish the goal of receiving the sensor data into as many gateways as possible. Such embodiments further accomplish the goal of distributing sensor readings to at least two mesh gateways to avoid LoRa mesh collisions. Accordingly, the network is enabled to add and locate mesh gateways while emphasizing gateway locations that have Ethernet backhaul. Orthogonal SFs between mesh and LoRaWAN assist in avoiding collisions. The network design further enables selection of optimum sensor SF to minimize TOA, while attempting to have adequate sensitivity to reach a backhaul gateway, while adding floating gateways if needed.

Certain technical characteristics relate to optimizing the operations of floating gateways 520. In certain embodiments, the network is designed to allow the transfer of sensor 530 publications via a floating gateway 520 to other floating gateways 521 and backhaul gateways, such as the backhaul gateway 510. In some embodiments, cState messages can be synchronized among floating gateways (520, 521) to reach isolated nodes via the respective collections, such as collections 526*a-c*. Such embodiments accomplish the goal of receiving and caching all sensor data, using a comparatively high SF cAdd to further minimize TOA.

Accordingly, the network design enables the adding and positioning of floating mesh gateways to efficiently cache sensor data, which in some embodiments can be accomplished by consulting the strategy publication. In some embodiments, the network design can enable delaying Sensor_mesh publications so that sensor readings are directly received by backhaul gateway 510. In some embodiments, the network design can enable synchronization of all collections with relays. In some embodiments, the network design can enable performing Sensor_backhaul cAdds after less delay than for Sensor_mesh cAdds. If after some delay a cState from backhaul gateway 510 indicates that the publication has not been received, then one can select a shorter delay for strong received cState signal strength and use a lower SF Sensor_backhaul cAdd to minimize TOA. In some embodiments, the network design can enable waiting for a predetermined amount of time until multiple publications can be included in a single cAdd LoRa transmission to use spare LoRa transmission packet capacity. In some embodiments, the network design can enable putting all received Sensor_mesh cAdds into the collection to complete the mesh.

Furthermore, in some embodiments, the network design can enable synchronization of all collections. For example, the network design can enable periodically sending Sensor_mesh cState (but not Sensor_backhaul cState to differentiate) but delaying cState if past history has shown that the node does not typically act as a double-hop floating gateway that accesses sensors that cannot be reached otherwise. In some embodiments, floating gateway cState IBLT can include all publications in its collection synchronized internally with relay between all collections, such that there is no need to ask for sensor publications that have already arrived at the backhaul gateway in any collection. In some embodiments, the network design can enable the use of orthogonal SF between mesh and LoRaWAN to avoid collisions. In some embodiments, optimum sensor SF is selected to minimize TOA while attempting to have adequate sensitivity to reach backhaul gateway 510.

Certain technical characteristics relate to optimizing the operations of the backhaul gateways 510. In certain embodiments, the network is designed to allow the transfer of sensor publications to backhaul gateways 510 and server 550 over Ethernet via collections 506a-d. In some embodiments, collections are synchronized via relays. In some embodiments, the network design supports relatively frequent synchronization with all backhaul gateways 510 and server 550 over Ethernet, such as via the IPv6 multicast protocol. In some embodiments, the network design enables sending Sensor_backhaul cStates with IBLT consisting of all received and synchronized publications so that LoRa mesh only sends missing sensor publications and can differentiate signal strength of backhaul gateways 510 to optimize cAdd SF and delays. In certain embodiments, backhaul cAdds are not performed over LoRa mesh since publications are already received in Ethernet collections. In some embodiments, the backhaul gateways 510 send cStates so floating gateways (520, 521) can differentiate and preferentially perform cAdds at appropriate SF.

The network design described herein enables further optimizations of backhaul gateways 510. For example, the network design enables adding and positioning backhaul gateways 510 at backhaul Ethernet connection points, where Ethernet cStates can be frequent, e.g., 1 second, and Ethernet cAdd delay can be close to zero.

Certain technical characteristics relate to optimizing the operations of one or more servers 550. The network design enables the transfer of sensor publications to the LoRaWAN network server 550 via the Sensor_Ethernet collection. In some embodiments, the server 550 can subscribe to Strategy publications to provide to allow gateway installation staff to optimize placement of gateways and/or servers.

In general, there may be multiple collections of publications synchronizing according to the embodiment of FIG. 5. For example, within a turbine room there could be separate collections for temperature and pressure sensor readings. This adds to the total LoRa traffic load and increases the value of LoRa bandwidth optimization. However, by segmenting the total sensor data load in this way the number of publications in each collection can be reduced.

According to various embodiments, another way to reduce the number of active publications is to use ephemeral publications that expire once after a specified time period in transit and when they have been collected in the backhaul gateways. By keeping the lifetime short, the number of active publications is reduced. Typically, a lifetime somewhat longer that the worst-case LoRa mesh transit time for a limited set of mesh hops can be used. Then once cAdds have been received in the Ethernet domain into the server they can be stored permanently. In this way each collection is capable or transporting sensor data from ~70*Sensor update period/LoRa transit time, which could be thousands of supported sensors for a sensor update period of 15 minutes and LoRa transit time of 10 seconds.

Strategy Publications and Optimization Via Machine Learning

There are several parameters in the DeftT transport which can be configured to increase the reliability and throughput of the system. These include the following example parameters:

Frequency of the cState Publications
Delay of the cAdd Publications
SF of the cAdd Publications.
Publication lifetime The SF of the cState could also be modified. However, given limitations in the SX1303 demodulator, initially a fixed SF10 at 500 kHz bandwidth is chosen for the LoRa mesh cState Publications.

Several techniques are available to dynamically adjust system parameters. One technique involves making an independent decision at each gateway using information available locally. In some embodiments, it is desirable to make decision on the choice of parameters independently in the local gateway nodes. A central authority, on for example the server, that determines the parameters and then transmits these to each gateway could be slow and complicated and prone to instabilities when the radio interference environment is rapidly changing. Another technique involves making an independent decision at each gateway, but using information collected from other nodes. Yet another technique involves having a central authority make decisions based on global data and communicate those to each node in a coordinated manner.

In some embodiments, the system implements the second approach (e.g., making an independent decision at each gateway, but using information collected from other nodes) by creating a compact binary Strategy_m publication that summarizes all the relevant system parameters for every gateway in a "room" and then publishes and distributes these to all gateways, as well as the servers for diagnostics and auditing. However, decisions are made in each local gateway and if the Strategy_m publication is missing or outdated, fallback processes can make useful decisions using locally available data.

An example of the system diagnostics summary Strategy_m is shown in Table 3. Typically, these diagnostics can be collected over a relatively long-time interval such as 30 minutes, and then broadcast, since for system stability, the parameter optimization should be slow and damped. The measurements include summaries of the relative strength and SF of the mesh and LoRaWAN sensor readings, together with the number of readings received. This together with gateway parameters such as LBT threshold, backhaul connection status, SF of cState and cAdd can all be summarized for a single gateway in a very small payload of approximately 7 Bytes, requiring minimal LoRa air time.

TABLE 3

Example Strategy_m System Diagnostics for each example Gateway for ML Optimization
Each Gateway 1 publication per gateway
Sensor Readings/Signal Strength

| | Sensor Signal Low Strength 0 | Sensor Signal Strength 1 | Sensor Signal Strength 2 | Sensor Signal High Strength 3 | |
|---|---|---|---|---|---|
| Low SF (SF8) | 2 bits | 2 bits | 2 bits | 2 bits | 1 Byte |
| | 0 none 3 max | 0 none 3 max | 0 none 3 max | 0 none 3 max | |
| High SF (SF10) | 2 bits | 2 bits | 2 bits | 2 bits | 1 Byte |

TABLE 3-continued

| Collections | | | | |
| --- | --- | --- | --- | --- |
| | cState Signal Low Strength 0 | cState Signal Strength 1 | cState Signal Strength 2 | cState Signal High Strength 3 | |
| Backhaul (Strategy_b) | 2 bits 0 none 3 max | 2 bits 0 none 3 max | 2 bits 0 none 3 max | 2 bits 0 none 3 max | 1 Byte |
| Floating (other) | 2 bits | 2 bits | 2 bits | 2 bits | 1 Byte |
| cAdds | 2 bits | 2 bits | 2 bits | 2 bits | 1 Byte |

| Gateway Settings | | | | |
| --- | --- | --- | --- | --- |
| Backhaul Ethernet Connected | LBT Threshold | cAdd SF | cAdd Delay | cState Frequency | |
| 1 bit 0 no 1 yes | 6 bit | 1 bit 0 low (SF7) 1 high (SF9) | 4 bit 0 low 16 max | 4 bit 0 low 16 max | 2 Bytes |
| | | | | | 7 Bytes |

Several measured characteristics of the system can be combined to determine the DeftT transport optimization parameters noted above. These will typically include those described above in the Strategy_m diagnostics publication, although local optimization of the parameters is also possible. Factors include: measured strength of the cState signals, number of publications that have been received by that gateway relative to other gateways, SF of the cAdd channel, number of LoRaWAN sensor publications received by this gateway, number of Publications immediately available for a cAdd, whether the cState is from a backhaul gateway or a floating gateway, as well as others. In addition, for some applications other parameters are useful. In outdoor use cases, such as communications between geographically dispersed measurement locations (such as distributed renewable energy solar DER or wind sites), geolocation coordinates of the gateway are a useful parameter. This can help to optimize the usage of gateways which are closer to the target system, so that the mesh transport converges to the desired end point.

Figure 6:
FIG. 6 shows an example publication optimization strategy in a secure wireless industrial mesh network, according to some embodiments.

One method of performing a multi-variate optimization includes the use of a merit function. An example of a two-variable merit function is shown in FIG. 6, which illustrates an example publication optimization strategy 600 in a secure wireless industrial mesh network, according to some embodiments. The parameters used for optimization include frequency of the cState publications 620. Together with RSSI signal strength 610, these parameters can impact the received number of publications 630 for a particular unit of time.

In an example, gateways that have received a higher fraction of the publications in the past as measured in the Strategy_m diagnostics are preferred for future publications. In addition, a higher system signal to noise or RSSI as measured by the LoRa radio and recorded in the Strategy_m Publication will result in a more reliable transmission. These two parameters (610 and 620 respectively) can be represented in the merit function shown in FIG. 6. Sending cState publications more frequently from gateways that receive cAdd publications more frequently and with higher signal strength will more rapidly gather all the sensor publications.

Once the signal strength reaches a sufficient level the LoRa transmission is reliable, and there may be no further gain in the merit function with further increases in the signal strength. In some embodiments of the system, however, the increasing signal strength can enable the use of a lower SF, with increases the system bandwidth. This reduces the TOA of the packet and opens space for additional packet transmissions. In the case of multiple SF, the merit function becomes more complex with different values for each SF.

In embodiments, the disclosed system may include ML optimization and/or training, which can act on the merit function, can include features representing the four optimization parameters described above (Frequency of the cState Publications, Delay of the cAdd Publications, SF of the cAdd Publications, and Publication lifetime). These can be represented as three separate functions (which can be coupled) and each can have multiple parameters sometimes derived from the Strategy_m publication. These functions can be applied as a look-up table. However, in some embodiments, ML algorithms that adapt to changes in the network enable the best LoRa utilization optimization. For example, a particular ML model can compare the merit functions between gateways and use additional parameters, which can be useful to determine whether all the sensor publications that were received from the last set of sensor readings have already been received. The model can be trained on the parameter data and/or actual sensor (performance) data to further refine the model.

One suitable form of merit function is the logistic function. Logistic functions are useful to define multi-variate merit functions such that many independent variables can be combined and the result be: single valued, smooth (without discontinuities), and appropriately model the desired output. Their simplicity of calculation allows them to be used in real time applications even on inexpensive computing platforms.

Another aspect of the application of the merit function and ML is the concept of randomness. Since system radio interference conditions can change, in some embodiments, a random factor can be included in each parameter adjustment. In this way the mesh network will not become "stuck" in a particular faulty set of optimization parameters (i.e. a local optimum) for repeated cycles of sensor readings but will instead succeed and adapt.

In addition to automated system parameter adjustments from the ML and merit function, the Strategy_m publication has additional uses. A system administrator or auditor can analyze the Strategy_m publications as seen on the servers and use this to better design the LoRa radio system infrastructure. For example, additional gateways can be added in areas of rooms that have bottlenecks. Alternatively, gateways can be moved if they are under-utilized and are carrying very little LoRa traffic.

Example of Transport Steps with Multiple Hops

Figure 7:
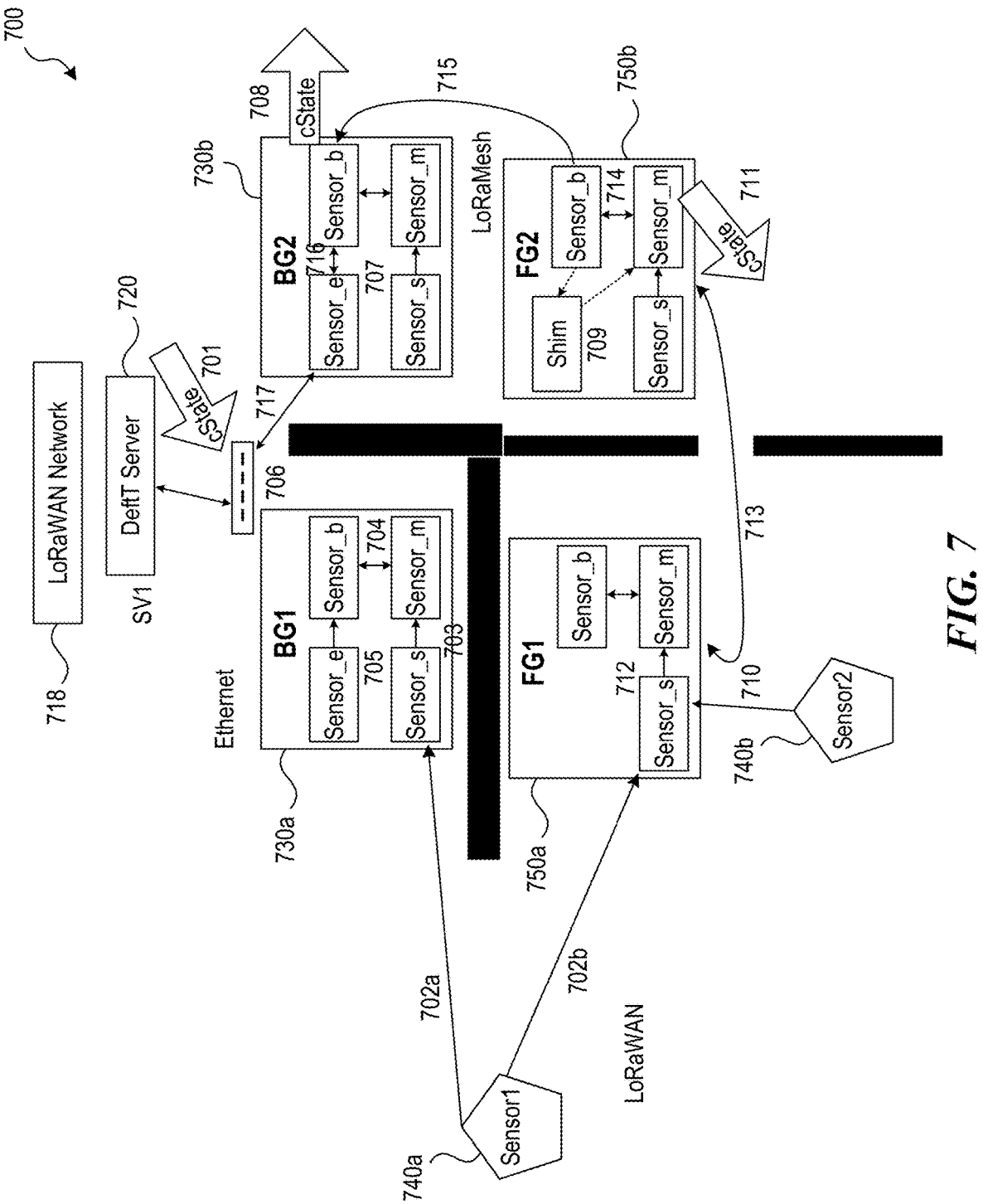
FIG. 7 shows an example multi-hop data transport operation in a secure wireless industrial mesh network, according to some embodiments.

FIG. 7 shows an example multi-hop data transport operation 700 in a secure wireless industrial mesh network, according to some embodiments of the disclosed system. As shown, the network includes a server 720, a first backhaul gateway 730a, a second backhaul gateway 730b, a first sensor 740a, a second sensor 740b, a first floating gateway 750a, and a second floating gateway 750b, disposed in an environment with shielding walls, like a nuclear power plant, which blocks many of the transmission paths.

At step 701, the DeftT server 720 sends an IPv6 Ethernet cState broadcast announcing that it currently has no publications in the Sensor_Ethernet collection, and is waiting. This is received by the first backhaul gateway 730a and the second backhaul gateway 730b. The first backhaul gateway 730a and the second backhaul gateway 730b currently have no publications either and so they do not respond. Therefore, the cState interest is retained in the first backhaul gateway 730a and the second backhaul gateway 730b in the pending interest tables.

At steps 702a and 702b, the first sensor 740a wakes up and makes a LoRaWAN broadcast of its reading that, due to its physical position, is received by both first backhaul gateway 730a (702a) and first floating gateway 750a. The sensor 740a reading is inserted into the Sensor_LoRaWAN collection.

At step 703, the reading is converted in a custom shim into a LoRa mesh format publication and is added to the Sensor_mesh collection at the first backhaul gateway 730a. The publication lifetime is set to 20 seconds and other copies inherit this expiration.

At step 704, all publications including sensor 740a reading in the first backhaul gateway 730a are copied into the Sensor_backhaul Collection.

At step 705, the sensor 740a reading is copied into the Sensor_Ethernet collection. Because of the very wide Ethernet bandwidth, which can support a high number of cAdds, first backhaul gateway 730a responds with minimal delay (~1 second) and broadcasts an IPv6 cAdd with the publication Sensor1_e, in response to the cState remaining from step 701. This is received by the DeftT Server SV1 in its Sensor_Ethernet collection. It is unpacked and forwarded to the LoRaWAN network (not shown).

At step 706, the Sensor_Ethernet Collection on the second backhaul gateway 730b also receives the cAdd of Sensor1_e.

At step 707, the cAdd of Sensor1_e is then copied in a DeftT relay of the second backhaul gateway 730b into the Sensor_backhaul Collection.

At step 708, second backhaul gateway 730b the periodically sends Sensor_backhaul LoRa mesh cStates to request missing mesh Publications for the collection. Because the backhaul gateways are a preferred destination, they will in general send the cStates more frequently, for example about every 2 seconds if new publications are present in a collection, although this can be varied using the ML approaches discussed previously. This Sensor_backhaul cState contains the IBLT which indicates that the second backhaul gateway 730b Sensor_backhaul Collection already has Sensor1_b, so it is not needed further. This cState can be sent with 500 KHz BW SF10, giving good sensitivity.

At step 709, the second floating gateway 750b receives the Sensor_backhaul cState from the second backhaul gateway 730b and saves it in the pending Interest table for some delay until the cAdd. The second floating gateway 750b does not have the Publication for a cAdd and as a floating gateway it wants to leave time for the publication to arrive another way, so it waits a longer time period (e.g., 5 seconds) to send a cState, to avoid unnecessary use of the constrained LoRa bandwidth.

At step 710, LoRaWAN sensors update with a 15-minute update period to save battery life. The reading from second sensor 740b, due to its placement, is only received by the first floating gateway 750a. Without this "transfer gateway", this sensor reading would otherwise be lost. Sensor2_s is received in the Sensor_LoRaWAN Collection and cached, by the first floating gateway 750a, along with Sensor1_s.

At step 711, the second floating gateway 750b sends a Sensor_mesh cState with an IBLT indicating it has no publications and this is properly received by the first floating gateway 750a due to the LoRa mesh signal strength, through the shielding wall (e.g., using 500 KHz BW and SF10).

At step 712, the Sensor_LoRaWAN readings are converted into Sensor_mesh publications.

At step 713 and in response to the Sensor_mesh cState from Step 711, the first floating gateway 750a publishes a cAdd combines Sensor1_m and Sensor2_m in a single LoRa transmission packet, saving LoRa TOA. In this example, the SF of the cAdd can be 125 KHz SF7, if the received cState in Step 711 was sufficiently strong (then the short LoRa mesh burst will have less TOA and channel utilization, but still have adequate signal-to-noise). Otherwise SF9 can be used, which should provide better signal-to-noise than the Step 711 cAdd (see Table 2), which was received correctly.

At step 714, the Sensor1_m and Sensor2_m cAdds are received into the Sensor_mesh Collection of the second floating gateway 750b and are copied into the Sensor_backhaul Collection of the second floating gateway 750b as Sensor1_b and Sensor2_b.

At step 715, in response to the earlier Step 708 cState, the second floating gateway 750b performs a mesh cAdd of only Sensor2_b in response to the Sensor_b cState (as described in Step 719). The wait after the cState allows time for additional arriving publications to be combined into a single LoRa transmission packet if possible. The cAdd is sent using the appropriate SF as determined by the received signal strength of that cState. The Sensor_1 Publication in second floating gateway 750b is unused and will eventually expire, but provides resiliency in case one of the other paths are not reliable.

At step 716, Sensor2_b reading is received and copied into the Sensor_Ethernet Ethernet Collection as Sensor2_e.

At step 717, Sensor2_e IPv6 Ethernet cAdd is performed in response to the latest Sensor_Ethernet cState.

At step 718, the server 720 now receives the second Sensor2 reading, converts it to standard LoRaWAN format and sends it to the LoRaWAN server software for decoding. It can also store the reading before the Sensor_Ethernet publication expires, to keep a full archive.

Advantageously, the above example shows that, without a wired connection to any of the floating gateways the Sensor2 reading is properly and securely received, despite the thick walls in the plant.

Critical Digital Assets (CDA)

Figure 8:
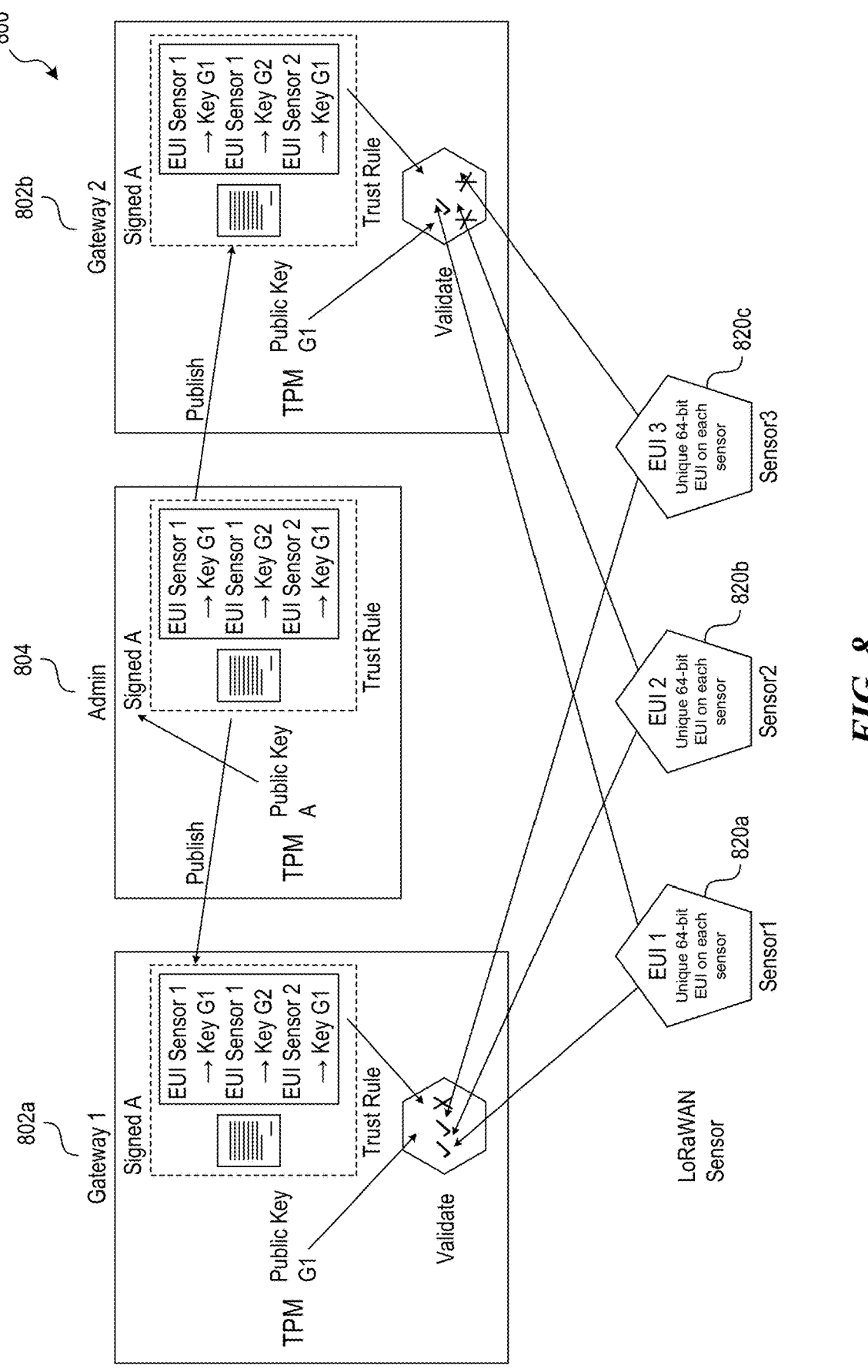
FIG. 8 shows network design adaptations to accommodate critical digital assets (CDA) in a wireless industrial mesh network, according to some embodiments.

FIG. 8 shows network design adaptations 800 to accommodate critical digital assets (CDA) in a wireless industrial mesh network, according to some embodiments. The example environment includes a first gateway 802a, a second gateway 802b, an administrator console 804, and sensors 820a-c.

For IIoT applications, there exists class of devices, CDA, which could have life-threatening consequences if they were subjected to a cybersecurity compromise. For example, in a nuclear power plant, an improper sensor reading could lead to incorrect operation and possibly a public safety emergency. Consequently, there are constraints on CDA devices, including a current requirement of hardwired connections. This raises costs, so it would be desirable to achieve similar levels of security in a lower cost wireless system.

LoRaWAN uses encryption with a shared key but no authentication. DeftT, by contrast, is more secure with regularly updated AEAD-128 group keys, and optionally more secure EdDSA asymmetric key signing for authentication. In addition, private keys in the LoRa mesh gateways are typically stored in a hardware TPM for greater security. In some embodiments the system extends this enhanced LoRa mesh gateway security to the entire LoRaWAN-LoRa mesh network for CDA applications, as shown in FIG. 8.

In a typical IIoT application the gateway is in a secure, controlled location. Therefore, the CDA standard of a wired sensor into the gateway is generally considered to be secure, since the sensor is also located in a physically secured environment. To achieve similar levels of security in a wireless system, LoRaWAN devices can have an Extended Unique Identifier (EUI), a 64-bit string, which is globally unique and is put in the device hardware by the manufacturer. This EUI can be associated with a specified wireless mesh gateway(s) private key through a trust rule. As shown in FIG. 8, an administrator with a very secure root key can create and sign a trust rule that specifies that only select sensors (as identified by their EUI) are allowed to connect to particular mesh gateways. Other sensor data, if received, will be ignored by the specified mesh gateways and discarded without forwarding.

For example, gateway 802*a*, which might be in a nuclear Turbine room, can be allowed to connect to two sensors: a vibration sensor 820*b* on a turbine and a thermostat 820*a*. Gateway 802*b* in the maintenance area can see the thermostat 820*a* only.

Suppose that a third sensor 820*c* has been illicitly smuggled into LoRaWAN wireless range, for instance to spoof a catastrophic turbine vibration event. This sensor is blocked from either gateway, even though third sensor 820*c* might know the shared LoRaWAN AES key. The unrecognized EUI of third sensor 820*c* will effectively block its attempt to insert illicit data. Thus, the spoofing is blocked. The EUI is typically stored in the third sensor 820*c* flash memory and may not be totally secure. However, even if the EUI is copied to another sensor, it cannot be used except when connected to the designated gateway in the secure location, and even then the duplicate gateways with the same EUI would be detected.

The above design avoids the potential vulnerability of placing a rogue sensor somewhere less secure on the LoRaWAN IP network, and feeding in spoofed data using the shared encryption key. Accordingly, the trust rule association provides the advantages similar to those of wiring the sensor directly to the secure gateway, but makes it possible to employ standard, much lower-cost, battery powered LoRaWAN sensors.

Other Example Uses of Wireless Mesh

While the detailed examples given above are for extending the usage of LoRaWAN sensor networks, other networks can also benefit from the approaches shown. For example, a LoRa mesh can provide a reliable long-range network for sending low bandwidth control signals and receiving meter readings from widely distributed assets, such as distributed energy resources (DER) solar or wind energy installations. Meter readings that are not LoRaWAN-based such as water or gas meters or other industrial gauges can also be accessed.

Moreover, other wireless media such as alternate 900 MHz modulation schemes or RFID wireless could also be used for many of the capabilities.

CONCLUSION

Although not required, aspects of the system are described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions reside on a client computer.

It will be appreciated that the secure wireless industrial mesh network can be applied in any number of suitable infrastructure systems, including: distributed commercial solar generation facilities; residential DER generation (solar, wind, hydro) systems, consumption (load control) systems, storage (battery) systems; distributed wind generation facilities (utility, commercial and residential scale); gas peaker plants; nuclear power plants; utility fossil fueled generation facilities; geothermal generating plants; sewage treatment facilities; water purification and/or distribution systems; gas infrastructure, pipeline and distribution systems; telecommunications infrastructure (current and next generation cellular, 5G, LoRa, Internet of Things (IoT) devices); smart building systems; and/or industrial Control systems (e.g., food processing and/or chemical systems).

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," and/or any variant thereof, means any connection or coupling, either direct or indirect, between two or more elements; the coupling and/or connection between the elements can be physical, logical, and/or a combination thereof. Additionally, the words "herein," "above," "below," and words of similar import, when used in this application, shall refer to this application as a whole and not to any particular portions of this application. As used herein, the term "and/or," as in "A and/or B" refers to A alone, B alone and both A and B. Where the context permits, words in the above Detailed Description using the singular or plural number may also include the plural or singular number respectively.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, and/or blocks are presented in a given order, alternative implementations may perform routines having blocks, or employ systems having blocks, in a different order, and some processes or blocks may be deleted, moved, added, subdivided, combined, and/or modified to provide alternative combinations or subcombinations. Each of these processes, message/data flows, and/or blocks may be implemented in a variety of different ways. Also, while processes and/or blocks are at times shown as being performed in series, these processes or blocks may instead be performed in parallel, and/or may be performed at different times. Further, any specific numbers noted herein are only examples: alternative implementations may employ differing values and/or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and systems provided herein can be applied to other systems, not necessarily the system described above. The elements, blocks, and acts of the various implementations described above can be combined to provide further implementations.

Any patents and applications and other references noted above, including any that may be listed in accompanying filing papers, are incorporated herein by reference. To the extent any materials incorporated herein by reference conflict with the present disclosure, the present disclosure controls. Aspects of the technology can be modified, if necessary, to employ the systems, functions, and concepts of the various references described above to provide yet further implementations of the technology.

From the foregoing, it will be appreciated that specific embodiments of the disclosed technology have been described herein for purposes of illustration, but that various modifications may be made without deviating from the technology. For example, the disclosed technology may be used with ICN data transfers performed by sending a request and receiving a response data packet, without using publish and subscribe. As a further example, the disclosed technology may be used to secure data communications outside of the utility infrastructure context. Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

In the present disclosure, the drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in greater detail below. The intention, however, is not to limit the technology to the particular implementations described. On the contrary, the technology is intended to cover all suitable modifications, equivalents, and alternatives.

What is claimed is:

1. A method performed by a distributed computing system, the method comprising:

with a wireless mesh network comprising a set of wirelessly connected gateways communicatively coupled to a plurality of sensors, the set of wirelessly connected gateways comprising a floating gateway and a backhaul gateway, wherein at least the backhaul gateway is coupled to a computing system via a communication channel, responsive to (1) receiving, at the backhaul gateway and via the computing system, a computing system collection state query, and (2) receiving, at the backhaul gateway and via at least one of the floating gateway and a sensor of the plurality of sensors, sensor data, performing operations comprising:

generating, by the backhaul gateway, a collection publication instruction comprising the sensor data;

transmitting, by the backhaul gateway, the collection publication instruction to the computing system via the communication channel; and synchronizing, by the backhaul gateway, the sensor data with the floating gateway, wherein the floating gateway is in wireless communication with the backhaul gateway.

2. The method of claim 1, wherein the backhaul gateway is a first backhaul gateway and the set of wirelessly connected gateways further comprises a second backhaul gateway, the method further comprising:

synchronizing, by the first backhaul gateway, the sensor data with the second backhaul gateway, wherein the second backhaul gateway is in wireless communication with the first backhaul gateway.

3. The method of claim 2, wherein the first backhaul gateway is associated with a first broadcast domain comprising a first floating gateway and a first sensor, and the second backhaul gateway is associated with a second broadcast domain comprising a second floating gateway and a second sensor, the operations further comprising:

separating the first broadcast domain at least in part from the second broadcast domain by assigning a first communication channel to the first backhaul gateway and a different second communication channel to the second backhaul gateway.

4. The method of claim 3, wherein the first communication channel and the second communication channel are selected from a range of wireless protocol channel frequencies.

5. The method of claim 4, wherein the wireless protocol is LoRa.

6. The method of claim 4, further comprising:

causing at least one of the first backhaul gateway, the first floating gateway, the second backhaul gateway or the second floating gateway to generate and broadcast a system parameter strategy publication.

7. The method of claim 6, further comprising:

causing the computing system to propagate the system parameter strategy publication to the remaining of the first backhaul gateway, the first floating gateway, the second backhaul gateway or the second floating gateway.

8. The method of claim 7, further comprising:

determining a parameter in the system parameter strategy publication using a machine learning model.

9. The method of claim 8, wherein the machine learning model is trained on at least one of performance data of the wireless mesh network and propagated strategy data.

10. The method of claim 6, wherein the system parameter strategy publication comprises a spread factor.

11. The method of claim 2, further comprising applying a trust rule to at least one of the first backhaul gateway, the second backhaul gateway, or the floating gateway, wherein a subset of the plurality of sensors are authorized to establish electronic communication with the at least one of the first backhaul gateway, the second backhaul gateway, and the floating gateway based on the trust rule.

12. The method of claim 1, wherein the backhaul gateway and the floating gateway are configured to generate and broadcast periodic gateway collection state queries, the operations further comprising:

causing the backhaul gateway to generate a periodic gateway collection state query at a higher temporal frequency than the floating gateway;

wherein the collection state query is configured to query the plurality of sensors for new sensor data.

13. The method of claim 1, wherein the backhaul gateway and the floating gateway are configured to generate and broadcast periodic gateway collection publication instructions, the operations further comprising:

causing the floating gateway to generate and broadcast collection publication instructions at a lower temporal frequency than the backhaul gateway;

wherein the collection publication instructions are configured to broadcast an electronic message comprising sensor data.

14. The method of claim 13, further comprising optimizing a spread factor for the collection publication instructions locally on at least one of the backhaul gateway and the floating gateway.

15. The method of claim 14, wherein the collection publication instruction is responsive to a collection state query received from a neighboring node, the operations further comprising:

optimizing the spread factor for the collection publication instructions locally based on a signal strength determined based on a collection state query message received from the neighboring node.

16. The method of claim 15, wherein the neighboring node is one of a sensor or a gateway.

17. The method of claim 1, wherein each of the plurality of sensors is communicatively coupled to at least two mesh gateways, the mesh gateways comprising at least one or more of a backhaul gateway or a floating gateway.

18. The method of claim 1, wherein the communication channel is a multicast communication channel.

19. The method of claim 1, wherein the communication channel is an Ethernet communication channel.

20. The method of claim 1, wherein the communication channel is an IPv6 communication channel.

21. The method of claim 1, wherein a sensor in the plurality of sensors is associated with equipment in any of: a commercial solar generation facility, distributed energy generation system, a load control system, a battery system, a distributed wind generation facility, a gas peaker plant, a nuclear power plant, a utility fossil fueled generation facility, a geothermal generating plant, a sewage treatment facility, a water purification and/or distribution system, a gas infrastructure, pipeline and distribution system, a telecommunications infrastructure system, a smart building system, or an industrial control system.

22. A distributed computing system comprising a set of wirelessly connected gateways communicatively coupled to a plurality of sensors, the set of wirelessly connected gateways comprising a backhaul gateway coupled to a computing system via a communication channel, the backhaul gateway structured to perform operations comprising:

receive, via the computing system, a computing system collection state query;

receive, via at least one of a floating gateway in the set of wirelessly connected gateways and a sensor of the plurality of sensors, sensor data;

in response to receiving the collection state query and the sensor data, generate a collection publication instruction comprising the sensor data;

transmit the collection publication instruction to the computing system via the communication channel; and synchronize the sensor data with the floating gateway.

23. The system of claim 22, wherein the backhaul gateway is a first backhaul gateway and the set of wirelessly connected gateways further comprises a second backhaul gateway, the first backhaul gateway structured to perform operations comprising:

synchronize the sensor data with the second backhaul gateway, wherein the second backhaul gateway is in wireless communication with the first backhaul gateway.

* * * * *